April 7, 1959 E. R. PRICE 2,880,704
POWER BOOSTER VALVE CONSTRUCTION
Filed Sept. 15, 1955 3 Sheets-Sheet 2

INVENTOR.
EARL. R. PRICE.
BY
William J. Hickey
ATTORNEY.

April 7, 1959  E. R. PRICE  2,880,704
POWER BOOSTER VALVE CONSTRUCTION
Filed Sept. 15, 1955  3 Sheets-Sheet 3

INVENTOR.
EARL R. PRICE.
BY
William P. Hickey
ATTORNEY 2,880,704
Patented Apr. 7, 1959

2,880,704
POWER BOOSTER VALVE CONSTRUCTION

Earl R. Price, South Bend, Ind., assignor to Bendix Aviation Corporation, South Bend, Ind., a corporation of Delaware Application September 15, 1955, Serial No. 534,434

11 Claims. (Cl. 121—41)

The present invention relates to novel means for controlling pneumatic devices; and more particularly to means for controlling pneumatically operated servo-motors and valves of the type adaptable for use in the braking system of an automotive vehicle or the like.

An object of the present invention is the provision of a new and improved control for a power operated master cylinder for braking systems and the like which can be operated with a minimum of manual effort and which responds quickly and accurately to movement by an operator.

Another object of the invention is the provision of a new and improved control valve structure of the type adapted to regulate two valve members simultaneously, which control valve structure with only slight modifications in design can be adapted for a multiplicity of uses which require differing amounts of control effort, and which uses may include situations where the force required to move the individual valve members of the control valve structure exceeds the force to be used in operating the control member of the control valve structure.

A further object of the invention is the provision of a new and improved power operated master cylinder and a control valve structure of the above described types which devices are simple in design, rugged in construction, efficient in operation and inexpensive to manufacture.

The invention resides in certain constructions and combinations and arrangements of parts and further objects and advantages will be apparent to those skilled in the art to which it relates from the following description of the preferred embodiments described with reference to the accompanying drawings forming a part of this specification, in which:

Figure 10 is a fragmentary cross sectional view taken on the line 10—10 of Figure 1.

Figure 1:
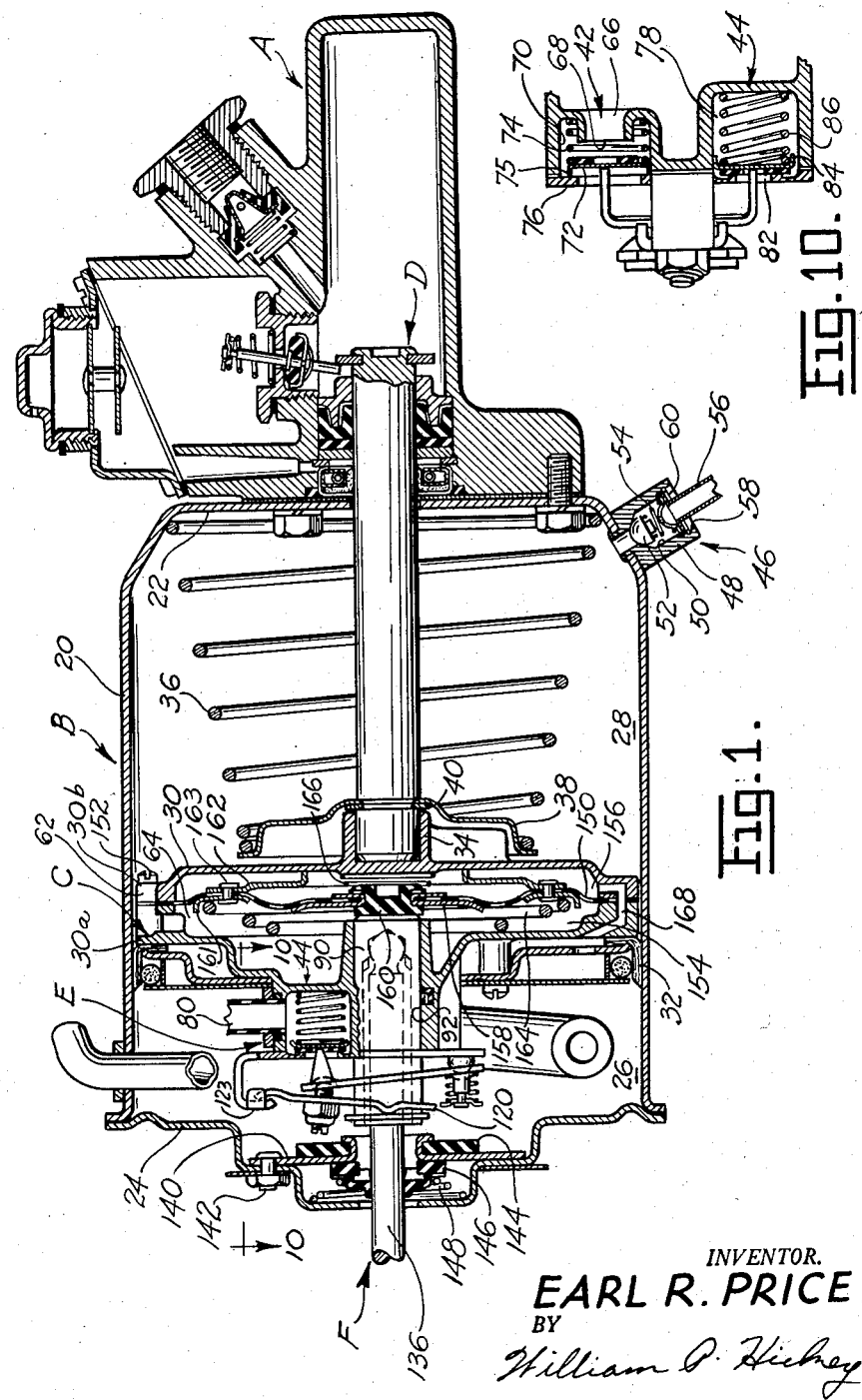
Figure 1 is a longitudinal view in section of a power operated master cylinder embodying the principles of the present invention.

Referring to the drawings, and particularly to Figure 1, there is shown therein a power operated master cylinder of the type used in hydraulic braking systems of automobiles and the like, and which embodies the principles of the present invention. The power operated master cylinder comprises a hydraulic cylinder A positioned on one end of a pneumatic fluid pressure servo-motor B having therein a movable wall C connected to a fluid displacement member D which projects into the hydraulic cylinder. Movement of the movable wall C is controlled by a new and improved valve structure E attached thereto and adapted to regulate the pressure differential applied to opposite sides of the movable wall; and the valve structure E is in turn regulated by the positioning of a movable or control member F which projects externally of the device where it may be positioned or controlled by an operator, in a manner well known in the art. For a more complete description of the construction and operation of the hydraulic cylinder A, reference may be had to Patent No. 2,690,740; and a more complete description of the new and improved servo-motor B will now be given.

The fluid pressure servo-motor B comprises a generally cup-shaped cylinder 20, the base or bottom 22 of which carries the hydraulic cylinder A and the opposite end of which is closed by a removable cover plate or member 24. The cylinder 20 is divided into front and rear opposed chambers 26 and 28 respectively by movable wall C which in the present instance comprises a power piston 30 having pneumatic pressure sealing means 32 on its outer edge adapted to bear against the side walls of the cylinder 20. The end of the piston 30 facing the hydraulic cylinder A is provided with a central boss 34 adapted to receive the adjacent end of the fluid displacement member D. The piston 30 and fluid displacement member D are biased away from the hydraulic cylinder A by a conically shaped coil spring 36, the small end of which bears against a spring retainer plate 38 slipped over the end of the fluid displacement member D and held in place by a snap ring 40, and the opposite end of which bears against the closed end of the cylinder 30 to which the hydraulic cylinder A is attached. (The end of the cylinder provided with the cover plate is normally positioned closest to the operator and will be hereinafter referred to as the front or forwardly positioned end.)

The fluid pressure servo-motor B is of the vacuum submerged type and movement of its power piston 30 is controlled by a new and improved control valve structure E mounted upon the front face of the piston C. The control valve structure E generally comprises a pair of poppet valves 42 and 44 (see Figure 10) spaced adjacent each other and positioned to one side of an imaginary plane passed through the longitudinal centerline of the piston 30, for reasons which will later be apparent, and which are adapted to be opened and closed by movement along axes generally parallel to the longitudinal center line of the servo-motor. As previously indicated, the fluid pressure servo-motor B of the preferred embodiment is of the vacuum submerged type wherein the opposed chambers 26 and 28 are normally subjected to, or submerged in, vacuum of equal intensity and wherein power operation is initiated by admitting atmospheric pressure to the chamber 26 to force the piston and the associated hydraulic displacement member D into the hydraulic cylinder A. A vacuum connection 46 is connected to opposed chamber 28 and comprises a cylindrical boss 48 counterbored as at 50 from its outer end to receive a spherically shaped valve member 52 biased against the bottom of the counterbore 50 by a helical spring 54 to form a check valve structure. Spring 54 is held in place by a flanged tubular closure member 56 seated in an enlarged counterbore 58 in the outer end of counterbore 50 and which closure member in turn is held in place by a snap ring 60. Vacuum from chamber 28 is communicated through passageway 62 to a piston or diaphragm chamber 64 (the purpose of which will later be described) internally of piston 30, which chamber in turn communicates with the port 66 of the poppet valve 42 previously mentioned.

Poppet valve 42 (see Figure 10) comprises an annular valve seat 68 located in a partition wall forming a cylindrical depression 70 in the front face of the piston 30 and which valve seat surrounds the valve port 66. Poppet valve 42 also comprises a disk-shaped valve closure member 72 positioned in the depression 70 and biased away from the valve seat 68 by coil spring 74 to normally permit vacuum to be supplied to front chamber 26 of the servo-motor through holes 75 in the skirt of the closure member. Spring 74 is held in place by a cover plate 76 which will later be described.

The atmospheric poppet valve 44 is formed by a cylindrical depression or valve chamber 78 in the front face of the piston 30 to which atmospheric pressure is communicated by a flexible connection 80 extending externally of the servo-motor. The valve chamber 78 is closed by the valve cover plate 76 on the front face of the piston; and which cover plate is provided with a valve port 82 adapted to be closed by a disc-shaped valve closure member 84 held in place by a coil spring 86.

The control valve structure E is completed by operating members or levers adapted to coordinate the opening and closing of the poppet valves 42 and 44. The control mechanism for the control valve structure E comprises a cylindrical control or plunger member 90 reciprocably mounted in a cylindrical bore 92 positioned on the longitudinal centerline of the servo-motor B and extending between the front face of the piston and the diaphragm chamber 64. An annular groove 94 is formed in the side wall of cylindrical bore 92 and is provided with a sealing member 96 of U-shaped cross section to prevent leakage between the forward end chamber 26 of the servo-motor and the piston chamber 64.

Reciprocatory movement of control member 90 relative to piston 30 is transferred to the poppet valves 42 and 44 by suitable control linkages. The control linkages shown in Figure 1 and better illustrated in Figures 4 and 5 comprise a first linkage or valve push plate 100 which surrounds the control member 90, as by a centrally located hole 102, and which push plate is provided with an upper portion which overlies the valves 42 and 44. The upper portion of valve push plate 100 is made to bear against the valve closure members 72 and 84 respectively of the valves as by inwardly turned portions or push arms 104 and 106.

The lower end of the plate 100 is pivotally supported to the valve cover plate 76 as by a pin 108 having a spherically shaped base portion against which plate 100 is held by a coil spring 110 which in turn is held in place by a retainer riveted to the forward end of the pin 108.

Push plate 100 is moved or operated by a second linkage or intermediate lever 120, the lower end of which surrounds control member 90 as by a hole 134, and the upper end of which intermediate lever bears against an abutment 123 formed by a forwardly projecting hook shaped bent portion of the valve cover plate 76 positioned radially outwardly of the poppet valves 42 and 44. Control member 90 is provided with an abutment ring 122 confined between shoulder 130 and snap ring 132 and which abutment ring 122 bears against and moves the lower end of the intermediate lever 120. Movement of the intermediate lever 120 is transferred to the valve push plate 100 by an adjustable abutment screw 124 locked in place by a nut 126b and adapted to abut the valve push plate 100 at a point generally between the poppet valves 42 and 44. This arrangement provides a mechanical advantage of approximately one, between the force applied to the control member 90 by the operator and the force which is in turn applied to the control valves 42 and 44 by the push plate 100.

Control member 90 is moved by a push rod 136, one end of which is seated in a cylindrical bore or recess 138 in the control member 90 and the other end of which extends through the cover plate 24 which closes the front end of the cylinder 20 where it can be positioned by the operator. An annular stop or abutment plate 140 through which the push rod 136 extends is mounted on the inside of the cover plate 24 as by bolts 142 and carries a rubber washer 144 against which the valve control linkages may abut when the piston 30 is in its retracted or most forwardly position. Vacuum leakage around the push rod 136 into forward chamber 26 of the servo-motor is prevented by an annular seal 146 tightly engaging the push rod 136 and positioned between the abutment plate 140 and the cover plate 24. A conically shaped coil spring 148 is positioned between cover plate 24 and the seal to bias the seal against the abutment plate 140 and prevent leakage therebetween.

The servo-motor B of the preferred embodiment is of the type which can be operated manually during power failure, and which during power operation produces a two-stage reaction to the control member 90, and thus to the operator, comparable to that felt in conventional braking systems—the first stage reaction being of a considerably smaller intensity than the second stage reaction, and the intensity of reactive force of each stage varying throughout the stage generally in proportion to the differential pressure applied across the movable wall. Where the unit is used to operate the hydraulic braking system of an automobile, the break point between the first and second stages will usually occur when the pressure differential across the movable wall corresponds to the point at which the automobile's brake shoes just engage the vehicle's brake drums.

The two-stage reaction is provided in the servo-motor illustrated in the drawing by a diaphragm 150 extending transversely across the internal piston chamber 64 and clamped between front and rear sections 30a and 30b respectively of the piston 30 by bolts 152 to provide front and rear piston chambers 154 and 156 respectively. The center portion of the diaphragm 150 is provided with a primary reaction member formed by a circular plate 158 which carries a rubber button or compression member 160 at its center in a manner permitting the button 160 to bear against the control member 90 and thereby transfer its reaction to the control member.

The second stage reaction member is formed by an annular plate 162 attached to the outer portion of the diaphragm as by plate 161 and rivets 163 and the radially inner portion of plate 162 is adapted to bear against the primary portion of the diaphragm. The annular plate 162 is normally held out of engagement with the primary portion of the diaphragm and against the rear wall of the piston chamber 64 by a conically shaped counter reaction spring 164 positioned between the front wall of the internal piston chamber 64 and the annular plate 161 such that small differential pressures across the diaphragm do not bring the plate 162 into engagement with the primary reaction portion of the diaphragm. Completely manual operation may be effected by forcing the control member 90 inwardly until button 160 is sandwiched between the control member and the rear wall of the piston. A light coil spring 166 is positioned between the central portion of the diaphragm and the rear wall of the piston chamber 64 to normally hold the primary reaction portion in contact with the control member 90. A passageway 168 in the walls of piston 30 communicates cylinder chamber 26 with internal piston chamber 156, such that differential pressure applied across piston 30 will be applied in an opposite direction across diaphragm 150. For a more complete understanding of the reaction feature reference may be had to the above mentioned Patent No. 2,690,740.

Operation

It will be remembered that the servo-motor B of the power operated hydraulic master cylinder shown in Figure 1 is of vacuum submerged type. That is, with the brake pedal, not shown, released, air from the front cylinder chamber 26 is evacuated through normally open poppet valve 42 through the front half of piston chamber 64 (chamber 154), passageway 62, rear cylinder chamber 28, and out vacuum connection 46. A power stroke of the hydraulic master cylinder is initiated by movement of push-rod 136 into the servo-motor B forcing the control member 90 to move inwardly relative to the piston 30. Movement of control member 90 pushes against intermediate lever 120 which pivots about abutment 123 causing its abutment screw 124 to press inwardly against valve push plate 100 approximately midway between the poppet valves 42 and 44. Push plate 100 is pivotally supported at a point spaced from the poppet valves in a triangular arrangement such that force applied to the push plate 100 is distributed to both poppet valves. Spring 74 of the vacuum poppet 42 requires less force to compress than does spring 86 of the atmospheric poppet 44, so that the initial movement of push plate 100 closes vacuum poppet 42 and thereafter opens atmospheric poppet 44 to admit air pressure into cylinder chamber 26. Increased pressure in cylinder chamber 26 forces piston 30 to the rear carrying with it the fluid displacement member D projecting into the pressure chamber of the hydraulic cylinder A. Initial movement of the fluid displacement member D permits the fluid check valve to close and thereafter forces fluid out of the discharge passage as is more fully explained in the above referred to patent.

When sufficient force has been supplied to the hydraulic system attached to the master cylinder A, the operator holds the push rod 136 stationary until piston 30 moves relative to control member 90 sufficiently to permit the poppet valves 42 and 44 to lap.

During the time that air pressure was admitted to cylinder chamber 26 to apply a differential pressure across piston 30, pressure from chamber 26 was also being applied to the rear piston chamber 156 to apply the same differential pressure across diaphragm 150 but in an opposite direction to the pressure differential across the piston. This produces a reaction force on the diaphragm 150 forcing it up against control member 90 to give the operator an indication or "feel" of the force being applied to the fluid displacement member D.

For a detailed explanation of the manner in which diaphragm 150 applies its reactive force to the control member 90, reference may be had to Patent No. 2,690,740 previously referred to.

Reduction of the pressure developed in hydraulic cylinder A is produced by retracting push rod 136 a desired amount. Spring 166 plus the differential pressure across diaphragm 150 continually keeps the control member 90 in contact with the push-rod 136 such that the control member 90 is retracted or moved forwardly relative to the piston 30. Forward movement of the control member 90 relative to the piston 30 permits the atmospheric poppet valve 44 to close and the vacuum poppet 42 to open causing air to be evacuated from the forwardly positioned cylinder chamber 26 to decrease the differential pressure across the piston. Spring 36 plus the pressure in the hydraulic cylinder A forces piston 30 forwardly relative to the control member 90 until the force of the differential pressure across the piston equals the force exerted by the spring and hydraulic cylinder; and the poppet valves 42 and 44 reach a lapped position. Complete retraction of push rod 136 of course permits the piston to be completely retracted and the vacuum poppet 42 to be completely opened subjecting the servo-motor B to its normal vacuum submerged condition.

As previously indicated the power operated hydraulic cylinder is of the type which may be operated manually upon power (vacuum) failure. This is accomplished by forcing push rod 136 into the servo-motor B in the normal manner. Under no power conditions, control member 90 is moved into the piston 30 until it forces button 160 against the rear wall of the piston chamber 156. Direct mechanical force is now transmitted to the fluid displacement member D and hydraulic pressure will be generated in the hydraulic cylinder A in the above described manner.

The present invention is capable of numerous embodiments and modifications adapted among other things to provide power operated master cylinders and pneumatic control valves requiring differing amounts of control effort. Several embodiments will now be described. Like parts of the several embodiments are designated by identical numerals, and similar parts of each embodiment by like reference numerals characterized further by having a distinguishing suffix attached.

Figures 2 and 3

Figure 2:
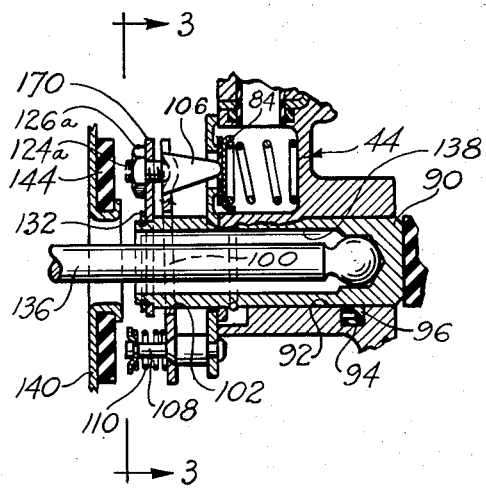
Figure 2 is a fragmentary cross sectional view of one embodiment of control valve structure which may be used in conjunction with the power operated master cylinder shown in Figure 1.
Figure 3:
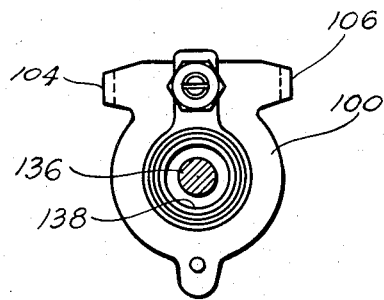
Figure 3 is a fragmentary cross sectional view taken on the line 3—3 of Figure 2.

Figure 2 and 3 show an enlarged fragmentary view of a second power operated master cylinder similar to that shown in Figure 1 but having another embodiment of control valve structure. The control valve structure of the present embodiment is similar to that shown in Figures 1, 4 and 5 excepting that the intermediate lever 120 of the first described embodiment is omitted and movement of the control member 90 is brought to bear directly upon push plate 100. This is done by replacing the abutment ring 122 of the first described embodiment with an abutment plate 170 which carries an abutment screw 124a secured by a lock nut 126a and adapted to bear directly against the push plate 100. The embodiment shown in Figures 2 and 3 requires less movement of the control member 90 to operate the poppet valves 42 and 44 than does the embodiment shown in Figures 1, 4 and 5; but on the other hand requires proportionally more control effort to operate than does the embodiment shown in Figures 1, 4 and 5.

Figures 6 and 7

Figure 6:
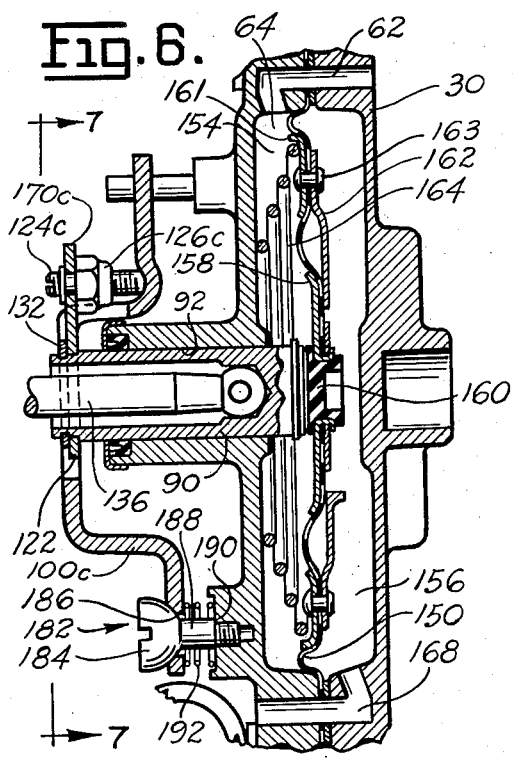
Figure 6 is a fragmentary cross sectional view of another embodiment of control valve structure which may be used in conjunction with the power operated master cylinder shown in Figure 1.
Figure 7:
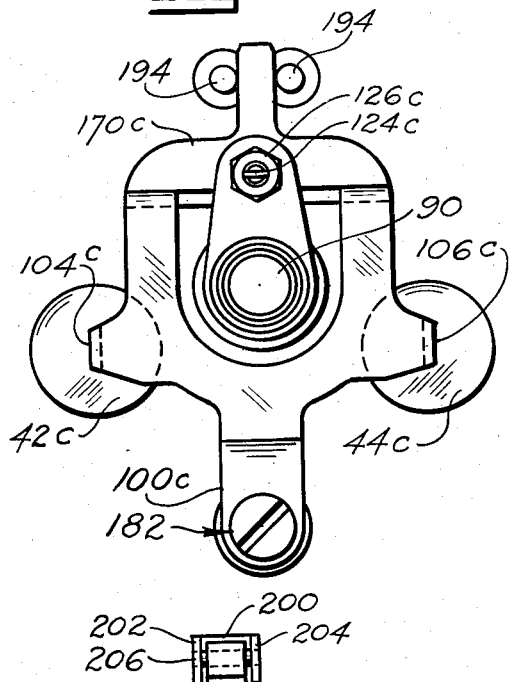
Figure 7 is a fragmentary cross sectional view taken on the line 7—7 of Figure 6.

Figures 6 and 7 show an enlarged fragmentary view of a third power operated master cylinder similar to that shown in Figure 1, but having its poppet valves 42 and 44 positioned below the horizontal centerline of the servo-motor B and employing a slightly different arrangement of control linkage. In the present embodiment the point at which the control member 90 applies force to the push plate 100c is positioned to the opposite side of the poppet valves 42c and 44c from the pivotal support or pin 182 for the linkage. The push plate 100c is pivotally connected to the piston 30 at its lower end by the headed pivot pin 182 which extends through a hole 186 in the end of the push plate 100c. The head 184 of the pin 182 has a spherical under surface adapted to permit pivotal movement of the push plate 100c and from which a cylindrical shank portion 188 extends. The pin 182 is secured to the piston 30 by a reduced diameter threaded portion forming a shoulder 190 with the cylindrical shank portion 188 and adapted to space the head 184 a sufficient distance from the face of the piston to permit free pivotal movement. A coil spring 192 is provided between the push plate 100c and the face of the piston to keep the linkage in engagement with the spherical under surface of the head 184 of the pin 182.

The push plate 100c contains projections 104c and 106c to operate the poppet valves 42 and 44 respectively and is provided with a centrally located cut out portion such that the linkage bridges the control member 90. The upper end of the push plate 100c is guided by a pair of guide pins 194 threaded into the piston 30, and the linkage is actuated or moved by an abutment plate 170c similar to that of the previous embodiment and is mounted on the control member in such a way that it contacts the push plate 100c at a point on the opposite side of the poppet valves from the pivot pin 182.

Rearward movement of the control member 90 forces the abutment screws 124c against the push plate 100c. Since in this embodiment the abutment screw is positioned to the opposite side of the poppet valves 42 and 44 from the pivot pin 182, the bottom of the valve control linkage is forced outwardly against the head 184 of the pin to produce tension in the pin. Initial movement of the control member 90 forces the vacuum poppet 42c inwardly until it bears upon its seat whereupon further movement of the control member 90 rocks the push plate 100c about the pivot 182 and vacuum poppet 42c as an axis to force the atmospheric poppet 42c open. Since the abutment screw 124c in the present embodiment is positioned away from the imaginary axis connecting the pivot 182 and the vacuum poppet 42c by a distance approximately equal to the distance which the atmospheric poppet 44c is positioned away from the same imaginary axis, approximately the same force will be applied to the atmospheric poppet 44c as was applied by the control member 90.

Figure 4:
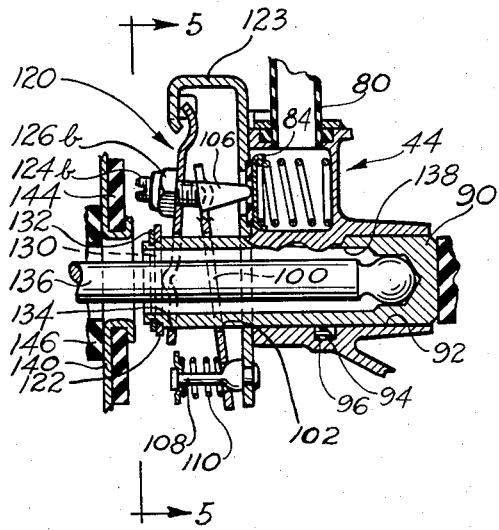
Figure 4 is an enlarged fragmentary cross sectional view of the control valve structure shown in Figure 1.
Figure 5:
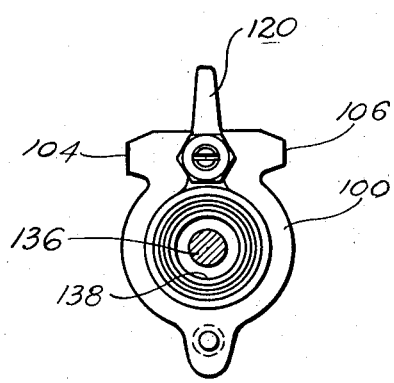
Figure 5 is a fragmentary cross sectional view taken on the line 5—5 of Figure 4.

It will be seen that this embodiment therefore provides a mechanical advantage of approximately two between the force applied to the control member 90 by the operator and the force which is in turn applied to the control valves by the control linkages, as does the embodiment shown in Figures 1, 4 and 5. This is accomplished in the present embodiment, however, without the use of an intermediate lever.

Figure 8:
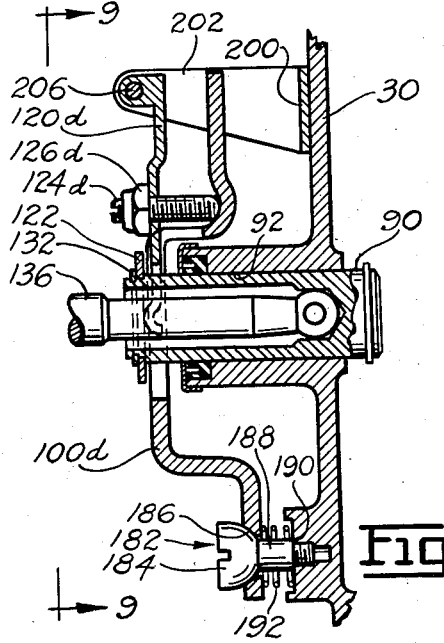
Figure 8 is a fragmentary cross sectional view of another embodiment of control valve structure which may be used in conjunction with the power operated master cylinder shown in Figure 1.
Figure 9:
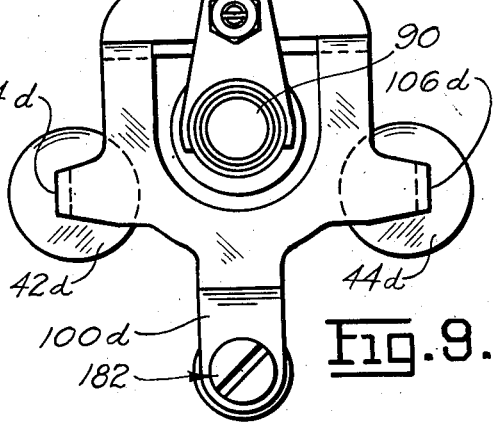
Figure 9 is a fragmentary cross sectional view taken on the line 9—9 of Figure 8.

*Figures 8 and 9*

Figures 8 and 9 show an enlarged fragmentary view of a fourth power operated master cylinder having a control valve structure very similar to that shown in Figures 6 and 7 but utilizing a second valve operating linkage as was done in the embodiment shown in Figures 1, 4 and 5. In the present embodiment a U-shaped bracket 200 is used in place of the guide pins 194 shown in Figures 6 and 7. The outstanding legs 202 and 204 of the U-shaped bracket, guide the upper portion of the push plate 100d, and the outer ends of the legs 202 and 204 carry a pin 206 which in turn supports one end of the intermediate control lever 120d. The other end of the intermediate control lever 120d is abutted by the abutment ring 122 of the control member 90 such that movement of the intermediate control lever 120d is transferred to the push plate 100d by an abutment screw 124d located approximately midway between the ends of the intermediate control lever 120d.

It will be seen therefore that the present embodiment operates in a manner very similar to that shown in Figures 6 and 7, excepting that an additional mechanical advantage is applied by the intermediate control lever 120d—the total effect being that the force applied to the poppet valves 42d and 44d may approach or exceed approximately four times that applied by the control member 90, depending of course upon the physical dimensions of the linkages and the positioning of the poppet valves with respect thereto.

While the present invention has been shown as embodied in a new and improved power-actuated master cylinder and a new and improved control valve structure comprising a pair of valves spaced from a pivotal support in a triangular arrangement, a valve control lever operatively connected to the valves and pivotal support, and means for applying a force to the valve control lever in the axial direction of the valves at a point positioned within the angle subtended by the pair of imaginary lines connecting the pivotal support with the pair of valves, it is not so limited. The means for applying force to the valve control lever may be positioned anywhere with respect to the valves and pivotal support, such that one or both of the valves may be moved in a direction opposite to that in which the control member is moved by the operator. Where for example, force is applied to the valve control lever at a point spaced to the opposite side of the pivotal support from that shown in the drawings, both valves could be pulled outwardly. Where the force is applied at a position spaced to the opposite side of an imaginary line connecting one of the valves and the pivotal support, from the other of the valves, one of the valves may be pushed in one direction and the other of the valves pulled in the opposite direction by a force pressing inwardly upon the lever.

Still other changes and modifications can be made to those embodiments shown in the drawing and while the preferred embodiments of the invention have been described in detail, I do not wish to be limited to the particular constructions shown which may be varied within the scope of the invention and it is the intention to cover hereby all adaptations, modifications and arrangements thereof which come within the practice of those skilled in the art to which the invention relates.

I claim:

1. In a fluid pressure servo-motor having a fluid chamber enclosure and a movable wall dividing said chamber into opposing fluid pressure chambers: a control member movable toward and away from said movable wall, an abutment on said movable wall positioned to one side of said control member, normally open poppet valve means in said movable wall constructed and arranged to be closed when depressed into said movable wall, a spring in said valve means urging said poppet valve means open, normally closed poppet valve means in said movable wall constructed and arranged to be opened when depressed into said movable wall, a spring in said valve means urging said poppet valve means closed, said normally open and normally closed poppet valve means being adapted to regulate pressure in one of said opposing chambers and being spaced apart and to the opposite side of said control member from said abutment, an unrestrained push plate overlying both valve means and said abutment, and abutment means interpositioned between said push plate and said control member on the same side of the control member in which both valve means are located for transferring inward movement of said control member to said valve means.

2. In a fluid pressure servo-motor having a fluid chamber enclosure and a movable wall dividing said chamber into opposing fluid pressure chambers: a control member slidably received in said movable wall for movement toward and away from said movable wall, an abutment on said movable wall positioned to one side of said control member, normally open poppet valve means in said movable wall constructed and arranged to be closed when depressed into said movable wall, a spring in said valve means urging said poppet valve means open, normally closed poppet valve means in said movable wall constructed and arranged to be opened when depressed into said movable wall, a spring in said valve means urging said poppet valve means closed, said normally open and normally closed poppet valve means being adapted to regulate pressure in one of said opposing chambers and being spaced apart and to the opposite side of said control member from said abutment, an unrestrained push plate extending around said control member and overlying both valve means and said abutment, and abutment means interpositioned between said push plate and said control member on the same side of the control member in which both valve means are located for transferring inward movement of said control member to said valve means.

3. In a fluid pressure servo-motor having a fluid chamber enclosure and a movable wall dividing said chamber into opposing fluid pressure chambers: a control member movable toward and away from said movable wall, an abutment on said movable wall positioned to one side of said control member, normally open poppet valve means in said movable wall constructed and arranged to be closed when depressed into said movable wall, a spring in said valve means urging said poppet valve means open, normally closed poppet valve means in said movable wall constructed and arranged to be opened when depressed into said movable wall, a spring in said valve means urging said poppet valve means closed, said normally open and normally closed poppet valve means being adapted to regulate pressure in one of said opposing chambers and being spaced apart and to the opposite side of said control member from said abutment, and an unrestrained push plate overlying both valve means and said abutment, said control member being adapted to bear against said push plate in the area generally between said poppet valve means.

4. In a power-actuated master cylinder and the like, a fluid pressure motor, a movable wall in said fluid pressure motor adapted for reciprocatory movement, a pair of valves carried by said movable wall and adapted for reciprocatory movement, a pivotal support carried by said movable wall and spaced from said valves in a triangular arrangement, a control member carried by said fluid pressure motor, and adapted for reciprocatory movement, said movable wall, said valves and said control member being reciprocable along generally parallel axes, a first valve operating member operatively connected to said valves and said pivotal support, and a second valve operating lever pivotally supported by said movable wall and said control member at spaced apart positions and operatively connected to said first valve operating member at a point between said spaced positions.

5. In a power-actuated master cylinder and the like, a fluid pressure motor having a generally centrally located longitudinally extending axis, a movable wall in said fluid pressure motor, a control member movable toward and away from said movable wall, a pair of spaced poppet valves in said movable wall positioned to one side of said control member, one of said valves being normally open and being adapted to be closed when depressed in said movable wall, and the other of said valves being normally closed and being adapted to be opened when depressed into said movable wall, a pivotal support on said movable wall and spaced to the opposite side of said control member from said poppet valves, a spring in said one valve urging its poppet open, a spring in said other valve urging its poppet closed, and unrestrained push plate overlying said valves and said pivotal support, and a second valve operating lever pivotally supported by said movable wall and said control member at spaced positions and operatively connected to said push plate at a point between said spaced positions.

6. In a power-actuated master cylinder and the like, a fluid pressure motor, a movable wall in said fluid pressure motor adapted for reciprocatory movement, a pair of valves carried by said movable wall and adapted for reciprocatory movement, a control member carried by said movable wall and adapted for reciprocatory movement, said movable wall said valves and said control member being reciprocable along generally parallel axes, a first valve operating member operatively connected to said valves, and a second valve operating lever pivotally supported by said movable wall and said control member at spaced apart positions and operatively connected to said first valve operating member at a point between said spaced positions.

7. In a power-actuated master cylinder and the like, a fluid pressure motor having a generally centrally located longitudinally extending axis, a pair of spaced poppet valves in said movable wall one of said valves being normally open and being adapted to be closed when depressed into said movable wall, and the other of said valves being normally closed and being adapted to be opened when depressed into said movable wall, a spring in said one valve urging its poppet open, a spring in said other valve urging its poppet closed, a control member reciprocably mounted on said longitudinal axis, a first valve operating member operatively connected to said valves, and a second valve operating lever pivotally supported by said movable wall and said control member at spaced positions and operatively connected to said first valve operating member at a point between said spaced positions.

8. In a fluid pressure servomotor having a fluid chamber enclosure and a movable wall dividing the chamber into opposing fluid pressure chambers: a control member extending into said enclosure and movable toward and away from said movable wall, an abutment on said movable wall, normally open poppet valve means in said movable wall constructed and arranged to be closed when depressed into said movable wall, a spring in said valve means urging said poppet valve means open, normally closed poppet valve means in said movable wall constructed and arranged to be opened when depressed into said movable wall, a spring in said valve means urging said poppet valve means closed, said normally open and normally closed poppet valve means being adapted to regulate pressure in one of said opposing chambers and being spaced apart from said abutment in a triangular arrangement, an unrestrained push plate overlying and engaging both valve poppet means and said abutment, and abutment means interpositioned between said push plate and said control member on the same side of the abutment in which both valve means are located for transferring inward movement of said control member to said valve means.

9. In a fluid pressure servomotor having a fluid chamber enclosure and a movable wall dividing the chamber into opposing fluid pressure chambers: a control member extending into said enclosure and movable toward and away from said movable wall, an abutment on said movable wall, normally open poppet valve means in said movable wall constructed and arranged to be closed when depressed into said movable wall, a spring in said valve means urging said poppet valve means open, normally closed poppet valve means in said movable wall constructed and arranged to be opened when depressed into said movable wall, a spring in said valve means urging said poppet valve means closed, said normally open and normally closed poppet valve means being adapted to regulate pressure in one of said opposing chambers and being spaced apart from said abutment in a triangular arrangement, an unrestrained push plate overlying and engaging both valve poppet means and said abutment, a lever pivotally supported at one end by said movable wall, abutted at its other end by said control member, and having an intermediate portion which bears against the portion of said push plate subtended by the angle formed by one of the valve means, the abutment, and the other of the valve means for transferring inward movement of said control member to said valve means.

10. In a power-actuated master cylinder and the like, a fluid pressure motor, a movable wall in said fluid pressure motor adapted for reciprocatory movement, a pair of valves carried by said movable wall and adapted for reciprocatory movement, a pivotal support carried by said movable wall and spaced from said valves in a triangular arrangement, a control member carried by said fluid pressure motor and adapted for reciprocatory movement, said movable wall, said valves and said control member being reciprocable along generally parallel axes, a first valve operating linkage operatively connected to said valves and said pivotal support, a second valve operating linkage pivotally supported by said movable wall and said control member at spaced positions and operatively connected at a point between said spaced positions to said first valve operating linkage at a position spaced to the opposite side of said pair of valves from said pivotal support.

11. In control valve mechanism: a housing having an internal chamber whose pressure is to be regulated, said chamber having inner and outer opposing end walls, said inner end wall having first and second valve ports communicating with said internal chamber, said first valve port having a surrounding valve seat which faces said outer end wall, and said second valve port having a surrounding valve seat facing away from said outer wall, first and second valve closure members for abutting the valve seats of respective first and second valve ports, a first spring biasing said first valve closure member out of engagement with its valve seat, a second spring biasing said second closure member into engagement with its seat, an abutment in said internal chamber carried by said inner end wall and spaced apart from said ports in a triangular arrangement, a valve push plate in said internal chamber and carried by said inner end wall for abutment with said valve closure members and said abutment, and a push rod projecting through said outer end wall for applying a pushing force on the portion of said valve push plate falling within the angle subtended by its portion abutting said first valve seat, said abutment, and its portion abutting said second valve seat, whereby simple, sensitive and positive sequential valve actuation is had from a point outside of said housing through said push rod.

References Cited in the file of this patent

UNITED STATES PATENTS

| | | |
|---|---|---|
| 1,148,779 | Jackson | Aug. 3, 1915 |
| 1,486,304 | Ross | Mar. 11, 1924 |
| 1,620,513 | Bragg et al. | Mar. 8, 1927 |
| 2,415,035 | Penrose | Jan. 28, 1947 |
| 2,462,015 | Whitten | Feb. 15, 1949 |
| 2,473,038 | Rockwell | June 14, 1949 |
| 2,587,404 | Stelzer | Feb. 26, 1952 |
| 2,685,170 | Price | Aug. 3, 1954 |